(12) United States Patent
Nagai et al.

(10) Patent No.: US 7,576,293 B2
(45) Date of Patent: Aug. 18, 2009

(54) INTERIOR ILLUMINATION DEVICE

(75) Inventors: Kentarou Nagai, Makinohara (JP); Masayuki Hirano, Makinohara (JP)

(73) Assignee: Yazaki Corporation, Tokyo (JP)

( * ) Notice: Subject to any disclaimer, the term of this patent is extended or adjusted under 35 U.S.C. 154(b) by 135 days.

(21) Appl. No.: 11/905,565

(22) Filed: Oct. 2, 2007

(65) Prior Publication Data
US 2008/0302646 A1  Dec. 11, 2008

(30) Foreign Application Priority Data
Oct. 2, 2006  (JP)  .............................. 2006-270777

(51) Int. Cl.
*H01H 3/00*  (2006.01)
(52) U.S. Cl. ...................... 200/339; 200/310
(58) Field of Classification Search ......... 200/310–317, 200/339
See application file for complete search history.

(56) References Cited

U.S. PATENT DOCUMENTS

| 7,213,932 B1 * | 5/2007 | Savicki, Jr. .................. 362/95 |
| 7,360,912 B1 * | 4/2008 | Savicki, Jr. .................. 362/95 |
| 7,416,310 B1 * | 8/2008 | Savicki, Jr. .................. 362/95 |
| 7,488,909 B2 * | 2/2009 | Kajiwara et al. ............ 200/310 |

FOREIGN PATENT DOCUMENTS

JP      2005-329884      12/2005

* cited by examiner

*Primary Examiner*—Michael A Friedhofer
*Assistant Examiner*—Lisa N Klaus
(74) *Attorney, Agent, or Firm*—Edwards Angell Palmer & Dodge LLP

(57) ABSTRACT

An interior illumination device includes a receiving housing of a design part having swinging shafts; a switching knob of a design part having swinging holes, said switching knob being swingably supported by the swinging shafts and the swinging holes; a switching unit of a functional part swingably supporting a switching lever; and a rotation regulating member interposed between the switching knob and the swinging shafts of the design part for regulating a swinging range of the switching knob. When the design part and the functional part are assembled with each other, the switching knob and the switching lever are connected to each other, and the switching lever is swung in conjunction with a swing of the switching knob.

4 Claims, 10 Drawing Sheets

INTERIOR ILLUMINATION DEVICE

CROSS REFERENCE TO RELATED APPLICATIONS

This application is on the basis of Japanese Patent Application No. 2006-270777, the contents of which are hereby incorporated by reference.

BACKGROUND OF THE INVENTION

1. Field of the Invention

The present invention relates to an interior illumination device mounted on an interior of a vehicle.

2. Description of the Related Art

Generally, an interior illumination device is mounted on a ceiling of a vehicle. Japanese Published Patent Application No. 2005-329884 discloses a conventional interior illumination device. As shown in FIGS. 11A and 11B, an interior illumination device 10 includes a design part 20 and a functional part 30. A ceiling board 40 is interposed between the design part 20 and the functional part 30. A switching knob 21 is swingably supported by a first swingably supporting part 22 in the design part 20. An engaged part 23 is formed in a concave shape at a rear side of the switching knob 21. Further, a switching lever 31 is swingably supported by a second swingably supported part 32 in the functional part 30. An engaging part 33 is formed in a convex shape at the second swingably supported part 32 of the switching lever 31.

When the design part 20 and the functional part 30 are assembled on the ceiling board 40, the engaging part 33 is engaged with the engaged part 23, and the switching lever 31 is swung in conjunction with an operation of the switching knob 21. When the switching knob 21 is operated, a not-shown electric circuit is switched by the switching lever 31, and a not-shown bulb of the interior illumination device 10 is lighted to illuminate an interior of a vehicle.

However, in the interior illumination device 10, because the switching knob 21 attached to the design part 20 is swingably supported by the first swingably supporting part 22, when an external force is applied to the switching knob 21 at a transportation of the interior illumination device 10, the switching knob 21 may be rotated to a position (angle) where the design part 20 and the functional part 30 are not allowed to be assembled with each other. In this case, it is necessary to return the switching knob 21 to a position where the engaging part 33 and the engaged part 23 are allowed to be engaged with each other. Therefore, assemblability of the design part 20 and the functional part 30 may be reduced.

Therefore, for preventing the switching knob 21 from rotating excessively with the external force, fitness between a main body of the design part 20 and the switching knob 21 at the first swingably supporting part 22 may be solid. However, in this case, operability of the switching knob 21 is reduced.

Accordingly, an object of the present invention is to provide an interior illumination device of which assemblability is improved.

SUMMARY OF THE INVENTION

In order to attain the object, according to the present invention, there is provided an interior illumination device including:

a receiving housing of a design part having swinging shafts;

a switching knob of a design part having swinging holes, said switching knob being swingably supported by the swinging shafts and the swinging holes;

a switching unit of a functional part swingably supporting a switching lever; and a rotation regulating member interposed between the switching knob and the swinging shafts of the design part for regulating a swinging range of the switching knob, wherein when the design part and the functional part are assembled with each other, the switching knob and the switching lever are connected to each other, and the switching lever is swung in conjunction with a swing of the switching knob.

Preferably, the rotation regulating member includes a rotation preventing part disposed at an end of the swinging shafts mounted on sidewalls facing each other of the receiving housing disposed at a rear side of the design part, and a regulating part disposed at a rear side of the switching knob.

Preferably, the swinging shafts mounted on the receiving housing include one swinging shaft having a large diameter and another swinging shaft having a small diameter facing each other, and the swinging holes of the switching knob include one swinging hole having a large diameter and another swinging hole having a small diameter facing each other. Respectively, the swinging shaft having a large diameter is fitted into the swinging hole having a large diameter, and the swinging shaft having a small diameter is fitted into the swinging hole having a small diameter.

These and other objects, features, and advantages of the present invention will become more apparent upon reading of the following detailed description along with the accompanied drawings.

DETAILED DESCRIPTION OF THE PREFERRED EMBODIMENTS

An embodiment of an interior illumination device according to the present invention will be explained with reference to FIGS. 1 to 10.

Figure 1:
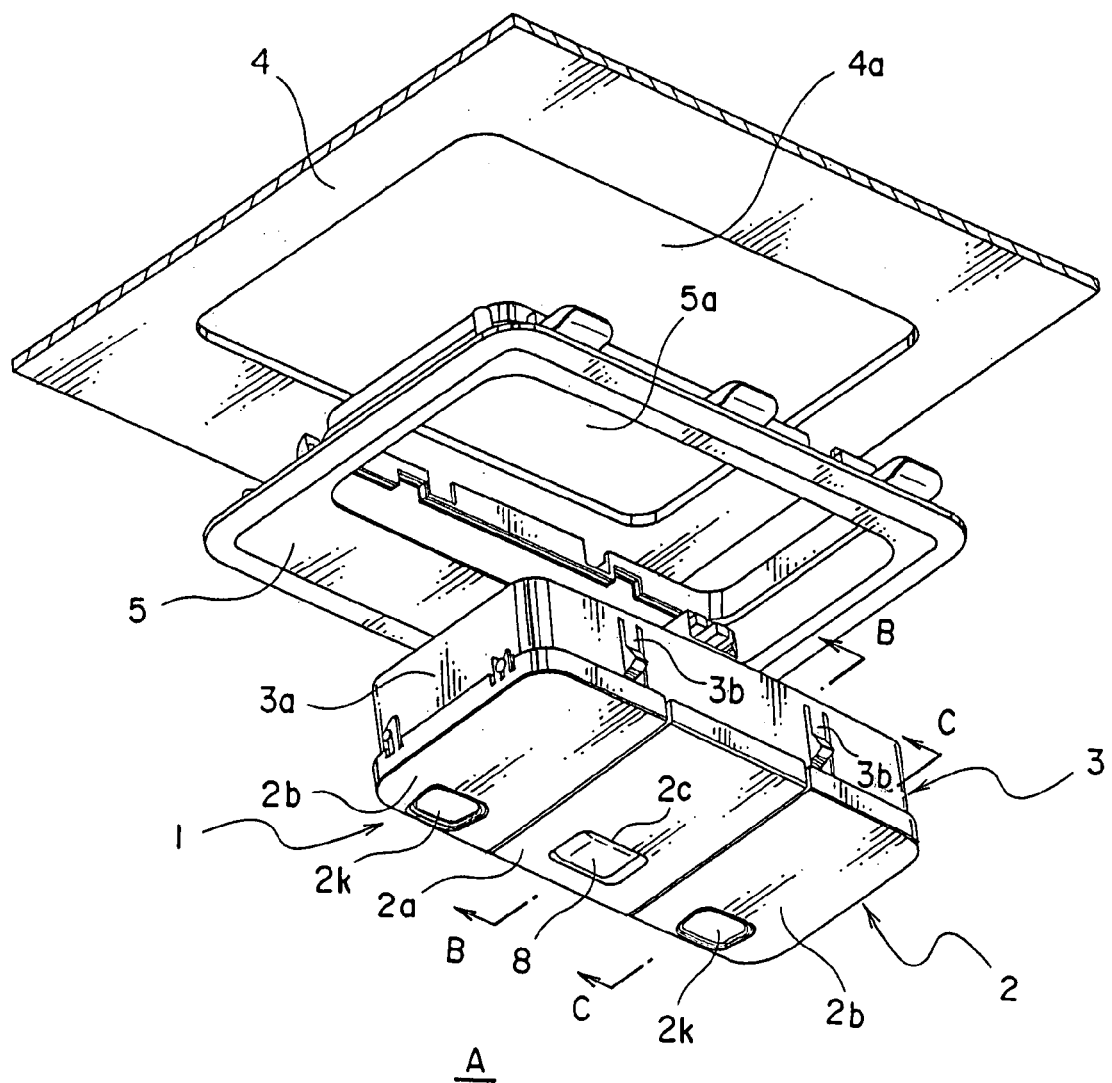
FIG. 1 is an exploded perspective view for explaining an assembling example of an interior illumination device according to the present invention.
Figure 2:
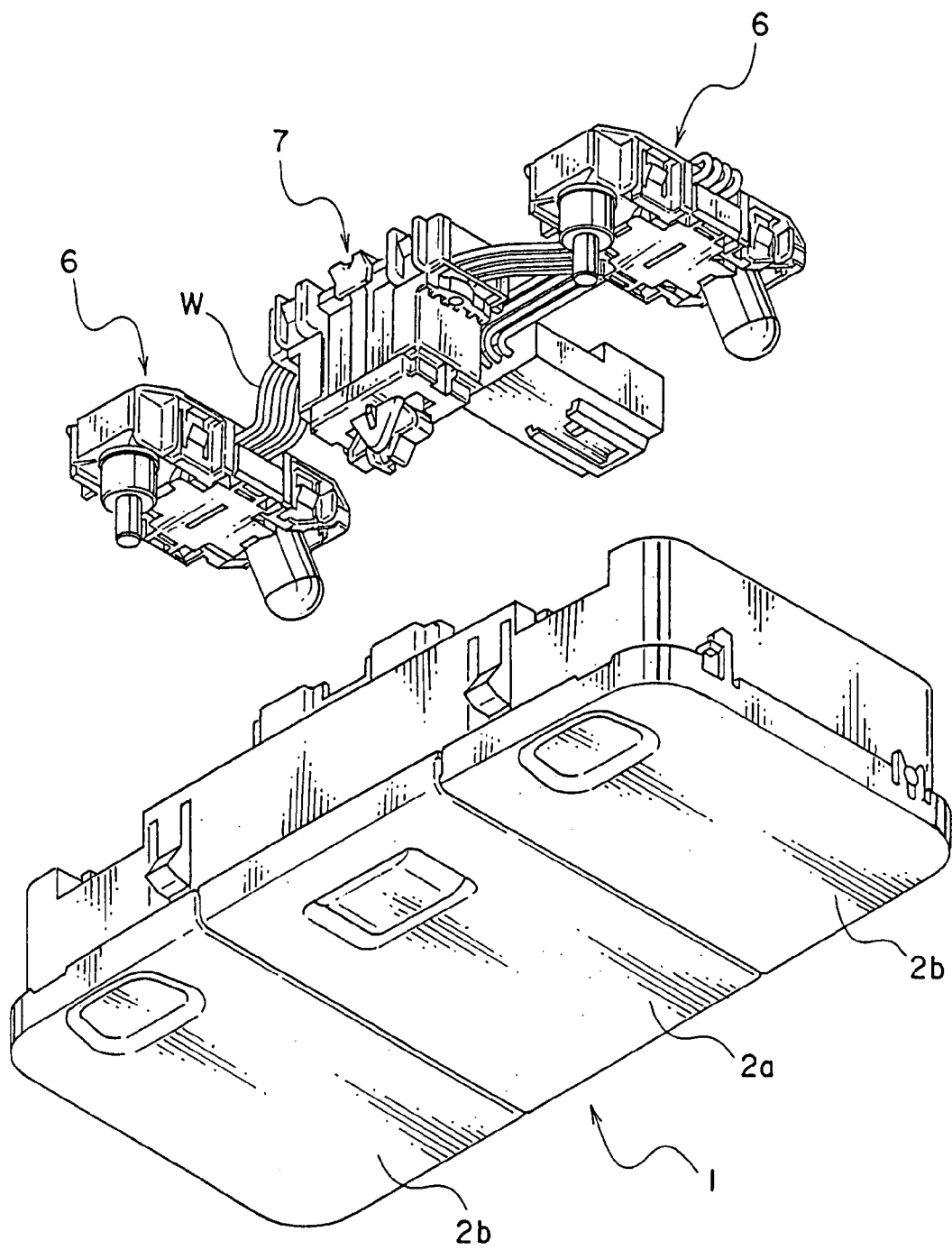
FIG. 2 is an exploded perspective view showing a design part and a switching unit of the interior illumination device in FIG. 1.
Figure 3:
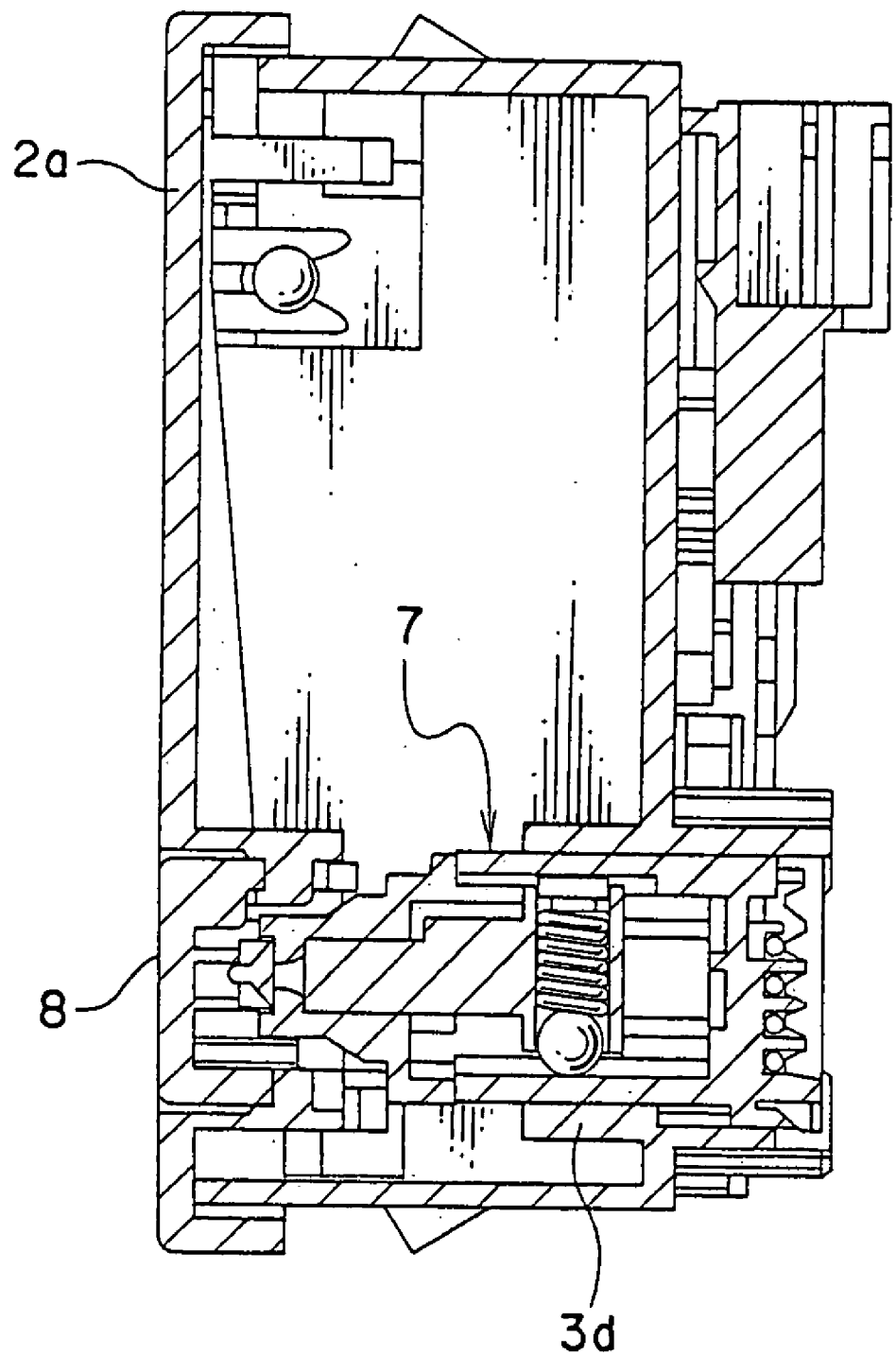
FIG. 3 is a sectional view taken on line B-B in FIG. 1.

As shown in FIGS. 1 to 4, an interior illumination device 1 for a vehicle includes a design part 2 and a functional part 3 mainly made of synthetic resin. In FIG. 1, a main body 3a of the functional part 3 assembled with the design part 2 is inserted into an opening 5a of an intermediate member 5 such as a sunglass holder, and an engaging arm 3b is engaged with a not-shown engaging part to be held by the intermediate member 5. Further, the intermediate member 5 is held in an opening 4a of a roof trim 4 as an interior ceiling board of a vehicle. Finally, as shown in FIG. 2 (the roof trim and the intermediate member 5 are not shown), an illumination unit 6 connected to an electric wire W at a rear side of the roof trim 4 and a switching unit 7 are attached to the main body 3a of the functional part 3 to finish a roof module A.

Figure 4:
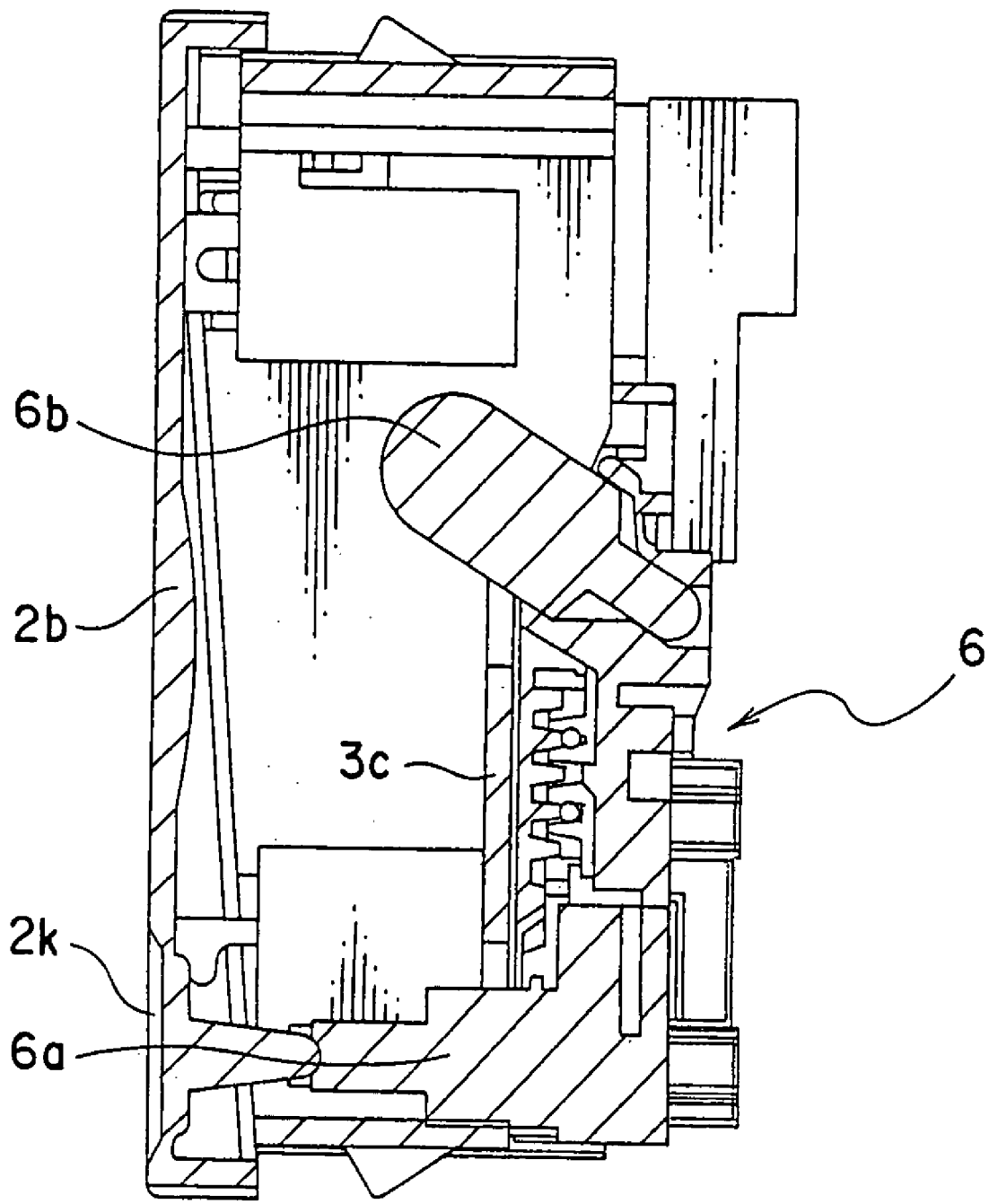
FIG. 4 is a sectional view taken on line C-C in FIG. 1.

As shown in FIGS. 2 and 4, the illumination unit 6 includes a push switch 6a and a bulb 6b to be lighted or lighted off due to a pushing operation of the push switch 6a. The push switch 6a and the bulb 6b are electrically connected to each other via a conductive bus bar or the like.

Figure 5:
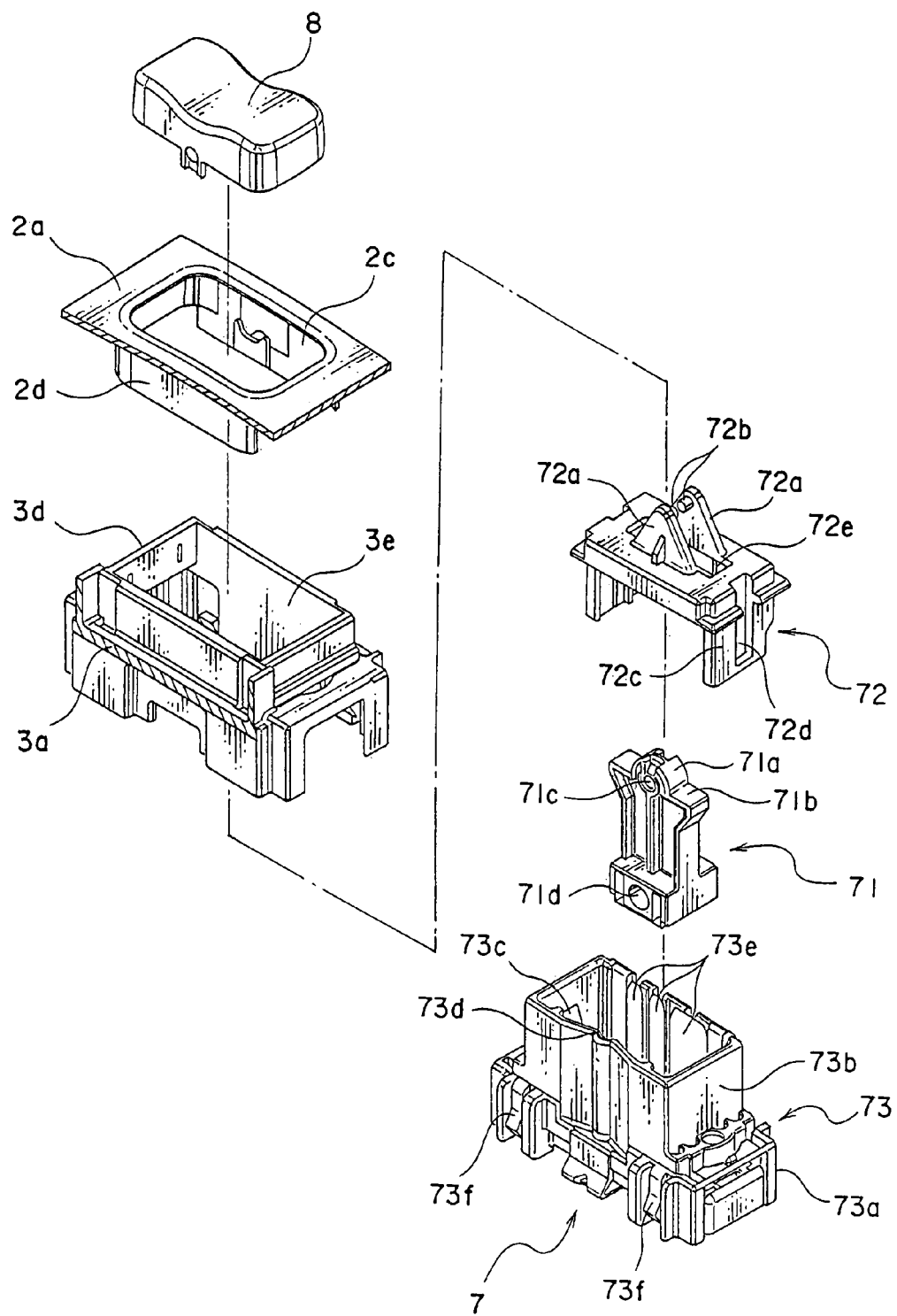
FIG. 5 is an exploded perspective view showing a switching unit in FIG. 1.
Figure 6:
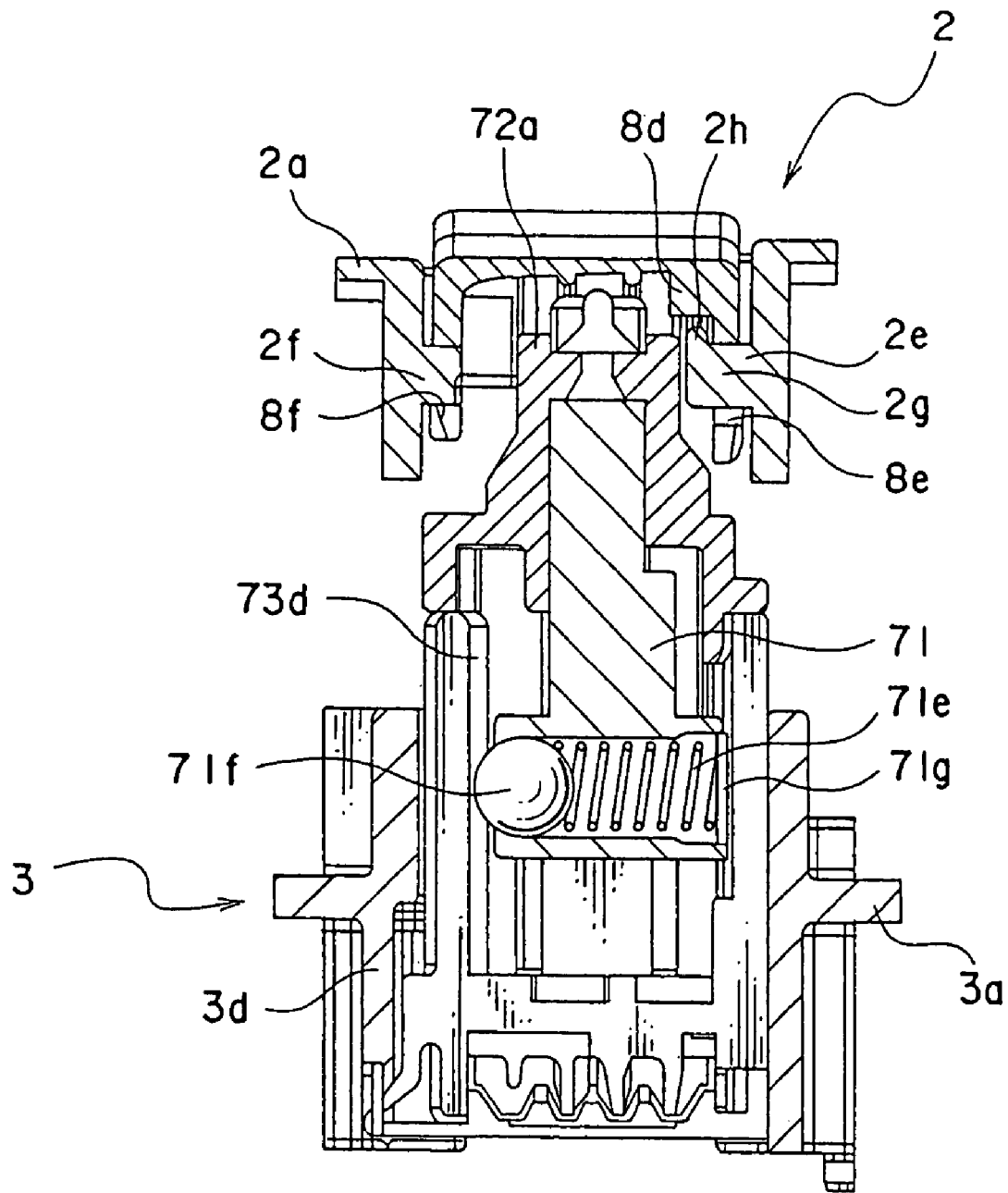
FIG. 6 is an enlarged sectional view showing the switching unit in FIG. 1.
Figure 7:
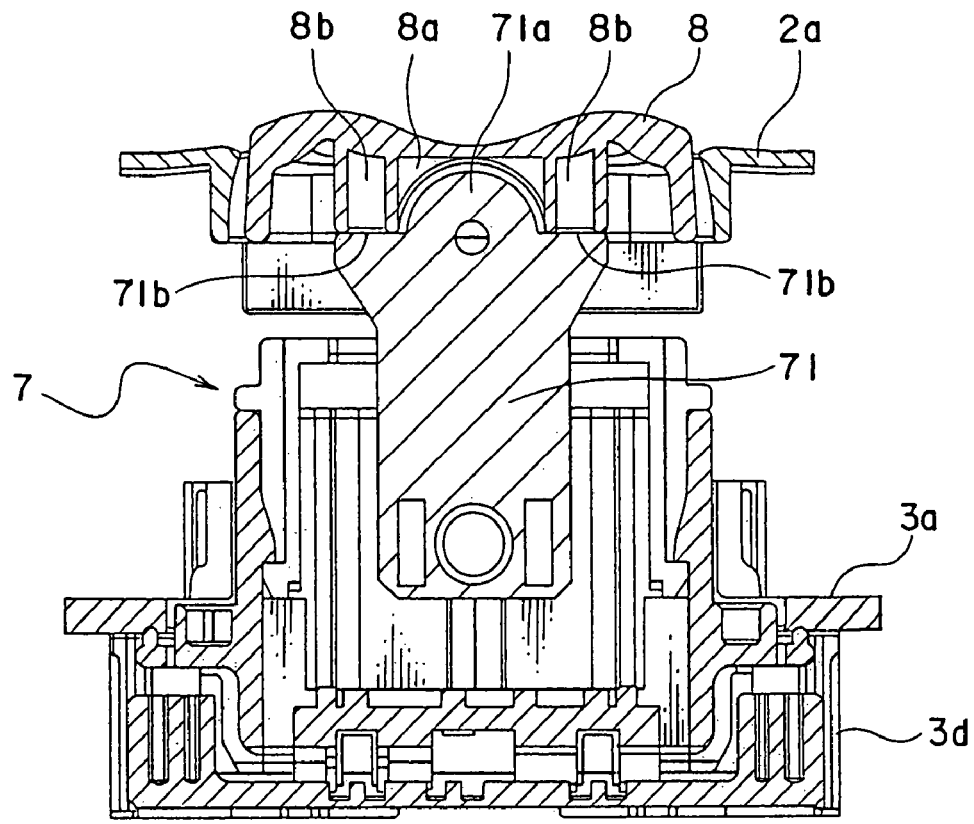
FIG. 7 is an enlarged sectional view showing the switching unit in FIG. 1 in a longitudinal direction.

As shown in FIGS. 5 to 7, the switching unit 7 includes a switching lever 71, a cover 72, and a housing 73. A semicircular projection 71a, an abutting part 71b for abutting an abutted part 8b of a switching knob 8, and a swinging hole 71c are formed on one end of the switching lever 71. A through hole 71d is formed on the other end of the switching lever 71. The through hole 71d receives a spring 71e as an elastic member, an engaging ball 71f disposed at one end of the spring 71e, and a conductive contact disposed at the other end of the spring 71e. The spring 71e resiliently urges the engaging ball 71f.

A pair of supporting pieces 72a, between which the opening 72e is interposed, is vertically arranged on a surface of the cover 72. Cylindrical swinging shafts 72b are mounted on respective walls facing each other of the supporting pieces 72a. An engaging part 72c having a slit 72d is formed at a rear side of the cover 72.

The housing 73 is composed of a base 73a and a substantially rectangular tube 73b extended from the base 73a. An engaging projection 73c and a vertically oriented groove 73d are formed inside the tube 73b. Three contact pieces 73e as parts of conductive bus bars are disposed on the tube 73b. A plurality of engaging arms 73f is formed on the base 73a.

An assembling method of the switching unit 7 will be explained. For assembling the switching unit 7, as shown in FIG. 5, the switching lever 71 is inserted into the opening 72e of the cover 72, and the swinging shafts 72b are engaged with the swinging hole 71c. Next, the switching lever 71 at the through hole 71d side is inserted into the tube 73c of the housing 73. Then, the engaging projection 73c of the housing 73 is engaged with the slit 72d of the engaging part 72c of the cover 72. Thus, the assembling is finished.

As shown in FIG. 6, in the assembled switching unit 7 according to the above, the switching lever 71 is swingably held, and the engaging ball 71f is fitted into the groove 73d of the housing 73. Thus, the switching lever 71 is positioned in a predetermined position.

As shown in FIGS. 1 and 2, the design part 2 is composed of a design cover 2a attached to the main body 3a of the functional part 3, and operational lenses 2b swingably disposed at both sides of the design cover 2a. The design part 2 composes a surface of the interior illumination device 1.

Figure 9A:
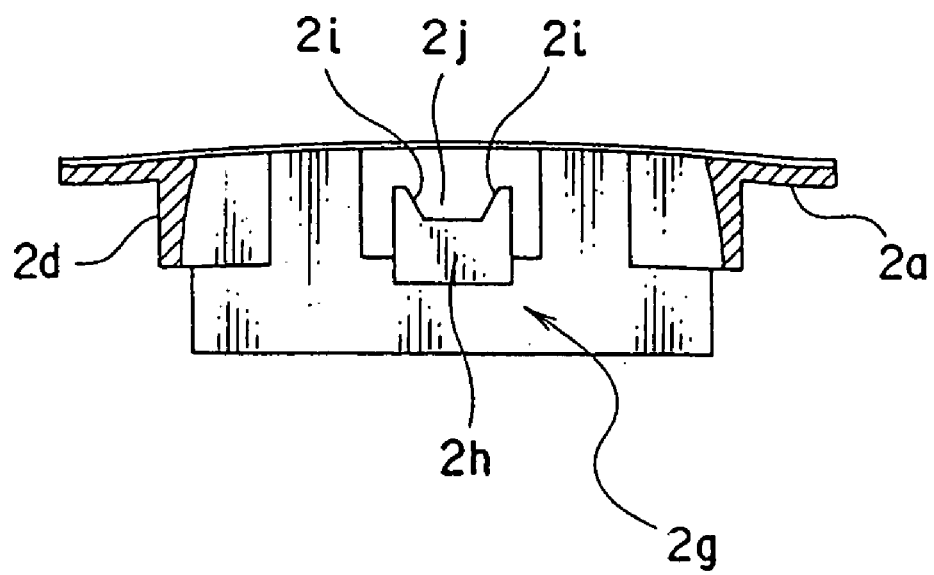
FIG. 9A is a sectional view showing a cover of the design part.
Figure 9B:
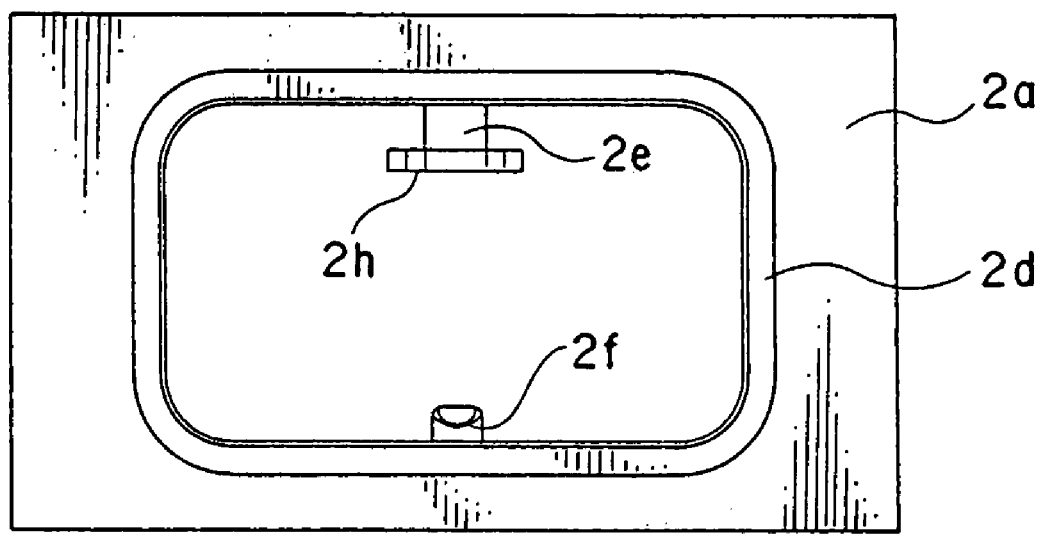
FIG. 9B is a top view showing the cover of the design part.

The design cover 2a includes an opening 2c through which the switching knob 8 is exposed. A receiving housing 2d for swingably supporting the switching knob 8 is formed on a rear side of the design cover 2a. As shown in FIGS. 6, 9A, 9B, a pair of cylindrical swinging shafts 2e, 2f is extended from sidewalls facing each other of the receiving housing 2d. The swinging shaft 2e is formed in a large diameter, and the swinging shaft 2f is formed in a relatively small diameter. A rotation preventing part 2g is formed on an end of the swinging shaft 2e. The rotation preventing part 2g includes a regulating wall 2h formed in a plate shape. A concave 2j having tapered walls 2i is formed on the rotation preventing part 2g at a front side of the design cover 2a.

Figure 8:
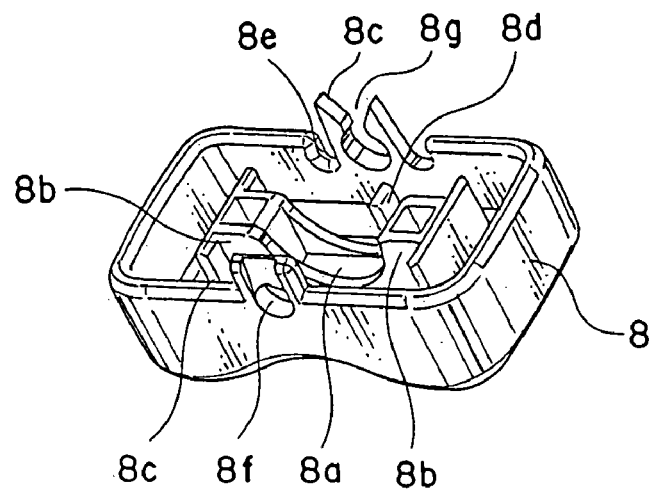
FIG. 8 is a perspective view showing a rear side of a switching knob shown in FIG. 5.

As shown in FIG. 8, a front wall of the switching knob 8 works as an operating part of a passenger. A receiving space 8a for receiving the projection 71a of the switching lever 71 and an abutted part 8b for abutting on the abutting part 71b via the receiving space 8a are formed on a rear side of the switching knob 8. Further, a regulating part 8d next to an engaging part 8c, and positioned in the concave 2j of the regulating wall 2h of the receiving housing 2d is projected from the switching knob 8. The swinging engaging part 8c includes a swinging hole 8e having a large diameter and a notch 8g. A swinging hole 8f having a small diameter and no notch is disposed at an opposite side of the swinging hole 8e.

An assembling method of the receiving housing 2d mounted on the design cover 2a of the design part 2 and the switching knob 8 will be explained. For assembling the switching knob 8 in the receiving housing 2d of the design cover 2a, firstly, the switching knob 8 is inserted into the receiving housing 2d via the opening 2c at the front side of the design cover 2a. Then, the swinging shafts 2e, 2f are respectively fitted into the swinging holes 8e, 8f. Then, the regulating part 8d is positioned in the concave 2j of the regulating wall 2h. While assembling, even if the switching knob 8 is to be assembled in a reverse direction, the swinging hole 8f having a small diameter cannot receive the swinging shaft 2e having a large diameter. In detail, the swinging hole 8f interferes with the regulating wall 2h formed at the end of the swinging shaft 2e. Therefore, an operator mechanically notices the wrong assembling.

The operational lenses 2b are made of transparent synthetic resin, and swingably attached to the main body 3a of the functional part 3. A concave operating part 2k is formed on a front wall of each operational lens 2b. A rear wall of each operational lens 2b is applied a "sibo" treatment. As shown in FIG. 4, the push switch 6a of the illumination unit 6 abuts on the operating part 2k. Accordingly, when the passenger pushes the operating part 2k, the push switch 6a is pushed via the operational lens 2b, and the bulb 6b is turned ON/OFF.

Next, an assembling method of the roof module A to which the interior illumination device 1 is attached will be explained with reference to FIGS. 1, 2, and 5.

Firstly, the switching knob 8 is inserted into the receiving housing 2d via the opening 2c at the front side of the design cover 2a. Then, the swinging shafts 2e, 2f are respectively fitted into the swinging holes 8e, 8f. Resultingly, the regulating part 8d is positioned in the concave 2j of the regulating wall 2h, and the switching knob 8 is swingably attached to the receiving housing 2d.

Next, the design cover 2a is attached to the center of the main body 3a of the functional part 3 with a not-shown engaging member. Further, the operational lenses 2b are swingably attached to the both sides of the design cover 2a.

Next, when the illumination unit 6 and the switching unit 7 are not attached to the main body 3a of the functional part 3, the main body 3a is inserted into the opening 5a of the intermediate member 5, and the engaging arm 3b is engaged with the not-shown engaging part. Further, the intermediate member 5 is attached to the opening 4a of the roof trim 4.

Finally, the illumination unit 6 connected to the electric wire W and the switching unit 7 are attached to the rear side of the roof trim 4. Thus, the assembling of the roof module A is finished.

As shown in FIGS. 6 and 7, after the interior illumination device 1 is assembled, the switching unit 7 is inserted into the opening 3e from the rear side of the main body 3a, and the base 73a is attached to a switching unit holder 3d via the engaging arms 73f. Then, the abutting part 71b of the switching lever 71 abuts on the abutted part 8b of the switching knob 8. Further, the swinging holes 8e, 8f of the switching knob 8, the swinging shafts 2e, 2f of the receiving housing 2d, the swinging shafts 72b, 72b of the cover 72, and the swinging hole 71c of the switching lever 71 are arranged in a line. Resultingly, the switching lever 71 is swingable owing to the operation of the switching knob 8. Further, the receiving space 8a of the switching knob 8 receives the semi-circular projection 71a of the switching lever 71. Therefore, when the passenger operates the switching knob 8 exposed through the opening 2c of the design cover 2a, the switching lever 71 is swung to turn a mode of the electric circuit (for example, the bulb 6b is continuously lighted, or lighted according to opening of a door). Further, because a supporting piece 72a of the switching unit 7 is disposed next to the regulating wall 2h of the swinging shaft 2e, an excessive displacement of the supporting piece 72a is prevented and the swinging shafts 72b are prevented from coming out of the swinging hole 71c.

Figure 10A:
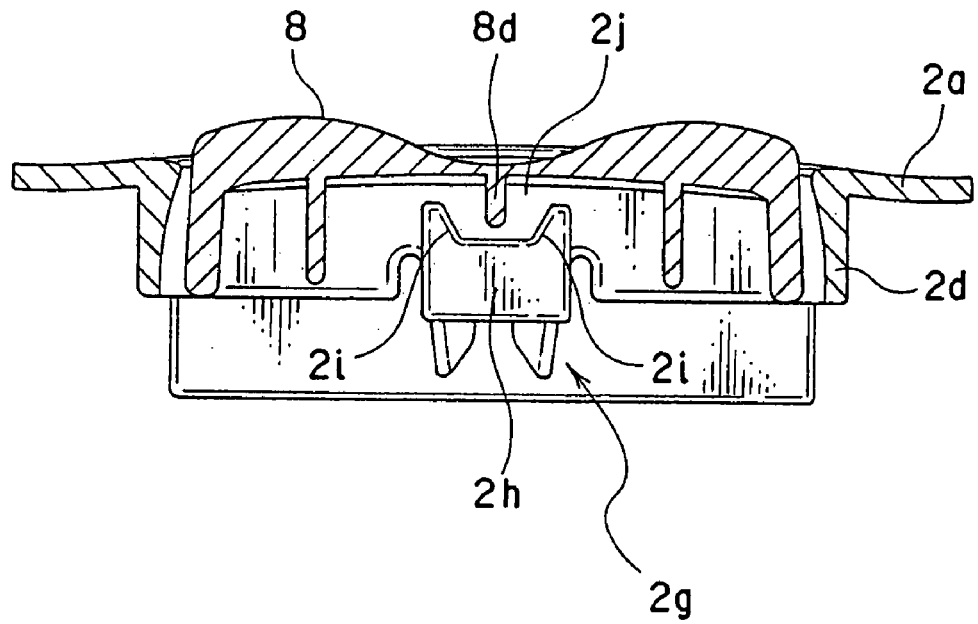
FIG. 10A is a sectional view showing a standby mode of the switching unit.
Figure 10B:
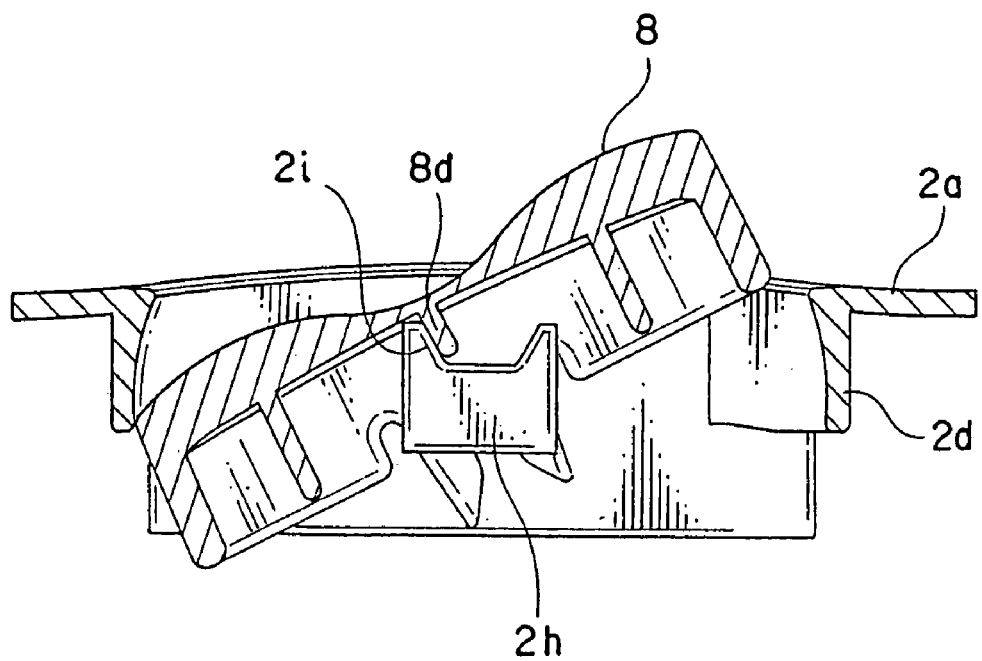
FIG. 10B is a sectional view showing a swinging mode of the switching unit.
Figure 11A:
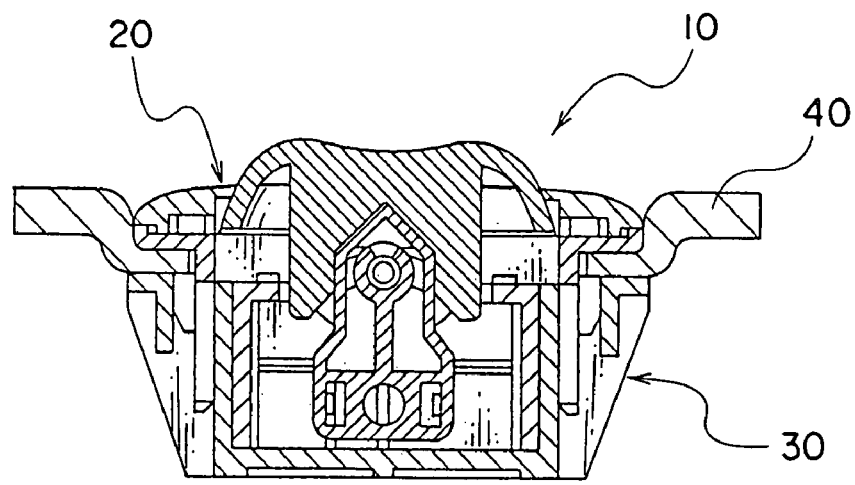
FIG. 11A is a sectional view showing a conventional interior illumination device.
Figure 11B:
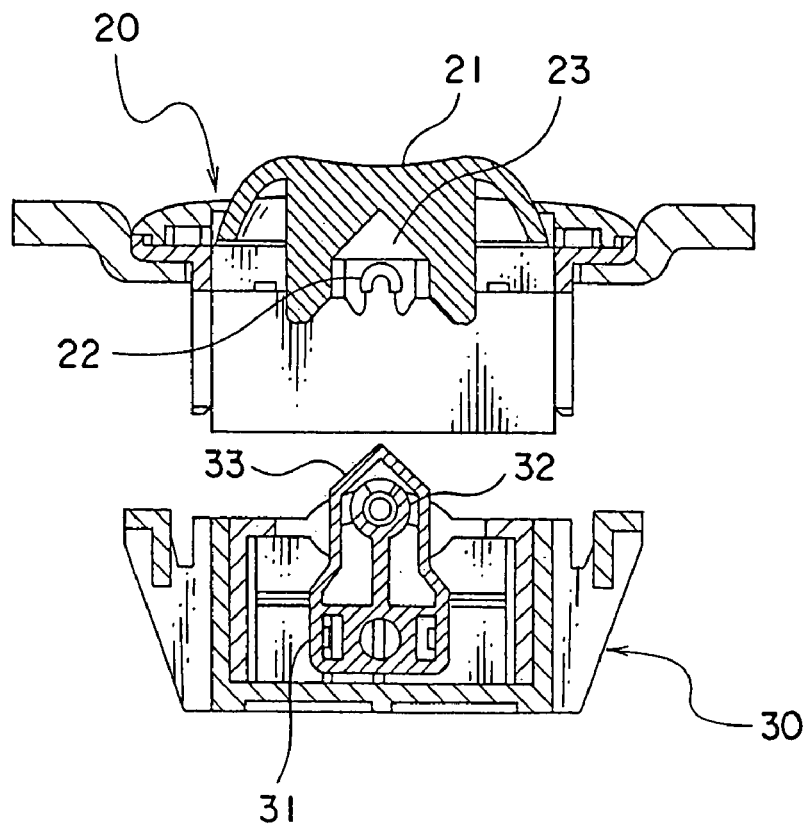
FIG. 11B is an exploded sectional view showing the conventional interior illumination device.

Next, a function of the rotation preventing part 2g and the regulating part 8d for preventing the rotation of the switching knob 8 according to the present invention will be explained with reference to FIGS. 10A and 10B.

When the switching knob 8 is swingably received in the receiving housing 2d of the design cover 2a, the regulating part 8d is positioned in the concave 2j of the rotation preventing part 2g, and a swing range of the switching knob 8 is limited to a range between two tapered walls 2i of the concave 2j. This swing range is a range in which the switching knob 8 is allowed to abut on the switching lever 71 when the switching unit 7 is attached to the main body 3a of the functional part 3. Thus, the switching knob 8 is prevented to rotate beyond the swing range due to external force, and assembling ability of the interior illumination device 1 is increased.

According to the interior illumination device 1 of the present invention, because the swinging engaging part 8c and the regulating part 8d are disposed at the rear side of the switching knob 8, the swinging shafts 2e, 2f are disposed on the sidewall of the receiving housing 2d disposed at the rear side of the design cover 2a, and the rotation preventing part 2g is disposed at the end of the swinging shaft 2f, when the switching knob 8 is swingably received in the receiving housing 2d, the rotation preventing part 2g and the regulating part 8d for preventing the rotation of the switching knob 8 are disposed at the rear side of the switching knob 8 and at a position hidden from the front wall of the design cover 2a. Therefore, a reduction of appearance is prevented compared to a case where the rotation preventing means is formed using the front wall of the design cover 2a.

Further, the regulating part 8d of the switching knob 8 is disposed in the concave 2j of the rotation preventing part 2g, and the swing range of the switching knob 8 is limited to the range between two tapered walls 2i. Therefore, the switching knob 8 is prevented to rotate beyond the swing range due to external force, and assembling ability of the interior illumination device 1 is increased. Further, the rotation preventing means is not formed by engaging the swinging holes 8e, 8f of the switching knob 8 and the swinging shafts 2e, 2f of the receiving housing 2d. Resultingly, an operability of the switching knob 8 is not reduced.

For rotatably supporting the switching knob 8 in the receiving housing 2d of the design cover 2a, the swinging shaft 2e having a large diameter is fitted to the swinging hole 8e having a large diameter, and the swinging shaft 2f having a small diameter is fitted to the swinging hole 8f having a small diameter. Therefore, when assembling, even if the switching knob 8 is to be assembled in a wrong direction, the swinging shaft 2e having a large diameter cannot be fitted into the swinging hole 8f having a small diameter. In detail, the swinging hole 8f interferes with the regulating wall 2h formed at the end of the swinging shaft 2e. Therefore, an operator mechanically notices the wrong assembling.

Further, after the interior illumination device 1 is assembled, because a supporting piece 72a of the switching unit 7 is disposed next to the rotation preventing part 2g of the swinging shaft 2e, an excessive displacement of the supporting piece 72a is prevented and the swinging shafts 72b are prevented from coming out of the swinging hole 71c.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An interior illumination device comprising:
   a receiving housing of a design part having swinging shafts;
   a switching knob of a design part having swinging holes, said switching knob being swingably supported by the swinging shafts and the swinging holes;
   a switching unit of a functional part swingably supporting a switching lever; and
   a rotation regulating member interposed between the switching knob and the swinging shafts of the design part for regulating a swinging range of the switching knob,
   wherein when the design part and the functional part are assembled with each other, the switching knob and the switching lever are connected to each other, and the switching lever is swung in conjunction with a swing of the switching knob.

2. The interior illumination device as claimed in claim 1, wherein the rotation regulating member includes a rotation preventing part disposed at an end of the swinging shafts mounted on sidewalls facing each other of the receiving housing disposed at a rear side of the design part, and a regulating part disposed at a rear side of the switching knob.

3. The interior illumination device as claimed in claim 1, wherein the swinging shafts mounted on the receiving housing include one swinging shaft having a large diameter and another swinging shaft having a small diameter facing each other, and the swinging holes of the switching knob include one swinging hole having a large diameter and another swinging hole having a small diameter facing each other, and
   wherein the swinging shaft having a large diameter is fitted into the swinging hole having a large diameter, and the swinging shaft having a small diameter is fitted into the swinging hole having a small diameter.

4. The interior illumination device as claimed in claim 2, wherein the swinging shafts mounted on the receiving housing include one swinging shaft having a large diameter and another swinging shaft having a small diameter facing each other, and the swinging holes of the switching knob include one swinging hole having a large diameter and another swinging hole having a small diameter facing each other, and
   wherein the swinging shaft having a large diameter is fitted into the swinging hole having a large diameter, and the swinging shaft having a small diameter is fitted into the swinging hole having a small diameter.

* * * * *